June 30, 1964  C. M. RICHARDS, JR  3,139,294
FLARED TUBE FITTING
Filed April 4, 1960

INVENTOR.
CHARLES M. RICHARDS, JR.
BY
Walter J. Jason
ATTORNEY

United States Patent Office 3,139,294
Patented June 30, 1964

3,139,294
FLARED TUBE FITTING
Charles M. Richards, Jr., La Jolla, Calif., assignor to General Dynamics Corporation, San Diego, Calif., a corporation of Delaware
Filed Apr. 4, 1960, Ser. No. 19,946
5 Claims. (Cl. 285—332.3)

This invention relates to flared tube fittings and more particularly to a seal for flared tube fittings which will seal against the leakage of small molecule fluids under high pressure and to provide a positive locating means for the seal.

Flared tube fittings are well known in hydraulic and pneumatic fluid transmission systems and other low to medium pressure lines. However, flared fittings have been inadequate in high pressure systems where pressures of approximately 8 to 9 thousand pounds per square inch prevail. Due to the uneven surface of flared portions of the tube, the tolerances permitted in machining, and the material hardness of the mating surfaces and parts, the flare could not be deformed sufficiently within permissive wrench torquing limitations to effect an adequate seal. Here the tube and fitting coupling is adapted to withstand 75,000 pounds per square inch, the flared portion of the tube assembly will not deform sufficiently to effect a seal without exceeding the maximum allowable torque limit. A dimensional check of all component parts of such a coupling will show that while each part is within certain acceptable dimensional tolerances and the abutting faces have particular surface finishes, certain parts can have a high tolerance while others will have a low tolerance, thereby doubling the permissible tolerance error. Thus, over torquing beyond the safe maximum limit will still not provide an effective seal. A metallographic examination of the mating surfaces at the seal will show the finish to be sufficiently uneven so as to cause leakage of helium gas under pressure. A grease, paste or similar filler compound forced between the mating surfaces and entering the porous structure of the metal is only partially effective as a seal and due to the existing limitation of contaminative particles entering into the system this practice is undesirable.

The flared tube fitting comprising the present invention consists of a washer of ductile material introduced between the mating surfaces of the tube and the fitting and has as an integral part of the washer a means for locating and retaining the washer in the proper position until the fittings and tube are joined. In operation when a tube is brought into contact with the fitting under pressure from the nut, the ductile material from the washer is deformed in the exact amount required to fill the void due to surface imperfections of the tube and the fitting and lack of exact mating, thereby effectively filling in any potential leakage path therebetween. The washer is held in the proper position until the seal is made, thereby preventing misplacement or damage.

It is therefore an object of the present invention to provide for a flared tube fitting which will seal against leakage of helium under an 8 to 9 thousand pound pressure.

Another object is the provision of a flared tube fitting seal which prevents leakage of small molecule fluids between a flared tube and its fitting and which has a positive means for positioning this seal on the fitting until the fitting and tube can be joined.

Other objects will become more apparent as the description of the invention proceeds wherein.

Figure 1:
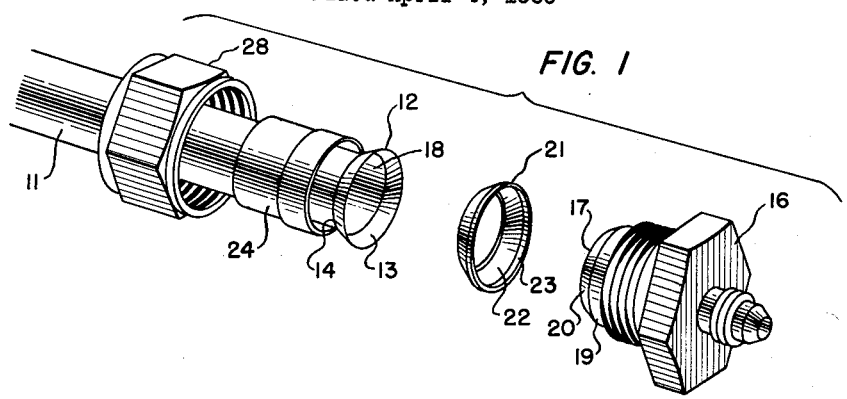
FIGURE 1 is a perspective view of the parts prior to assembly.
Figure 4:
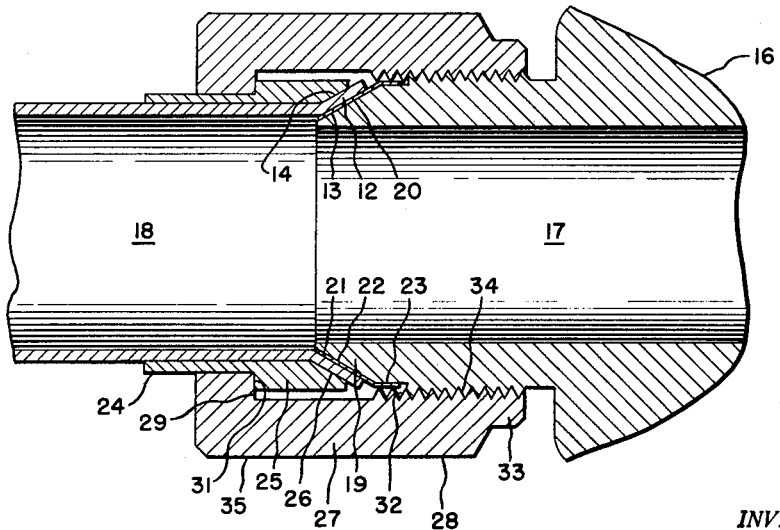
FIGURE 4 is a cross-sectional view of the coupling in assembled condition.

Referring now to FIGURES 1 and 4 there is shown tube 11, the end portion of which is formed with a flared end portion 12 having a flared, preferably conical, internal face 13 and an annular flared or conical external face 14. The tube is formed of suitable metal such as aluminum alloy, copper, or steel, which can be expanded to form this flared end portion. Many applications require the tube to have a 50,000 to 75,000 p.s.i. yield strength. A tubular fitting 16 has a conduit 17 which is coaxial with and communicates with the bore 18 of tube 11. This fitting 16 is provided at its end 19 with a tapered, preferably conical, seat 20 which, within normally acceptable tolerances, is adapted to fit against the internal conical face 13 on the tube 11. A ductile washer 21 of oxygen free malleable copper has a conical shape 22 corresponding to that of internal flared face 13 of the flared end portion 12 of tube 11 and the conical tapered seat 20 of fitting 16. Oxygen free copper is defined as 99.996 percent pure copper and is preferred since there is no flaking or chipping in use and does not become embrittled during work hardening. Other metals such as soft aluminum or nickle may be used, such as in conducting hydrogen peroxide where copper would be unsuitable, provided they are of a low yield range, such as 8–10,000 p.s.i. This washer 21 has a cylindrical skirt 23 adapted to fit over the end 19 of the fitting to position the washer for assembly. A sleeve 24 fits around the tube and is provided at its inner end 25 with an internal annular flared preferably conical surface 26 that forms a bore which, within tolerances, fits against the external flared or conical face 14 on the end 12 of the tube 11. A collar portion 27 on nut 28 fits around the sleeve 24 and is provided at one end 29 with a shoulder adapted to abut against a shoulder 31 on sleeve 24 and with an internal screw-thread 32 at its other end 33 engaging a corresponding external thread 34 on the fitting 16. The outer surface 35 of the collar portion 27 is preferably hexagonal to accommodate a wrench for connecting or unconnecting the coupling.

Figure 2:
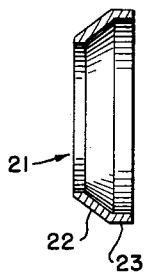
FIGURE 2 is a cross-sectional view of the seal washer.
Figure 3:
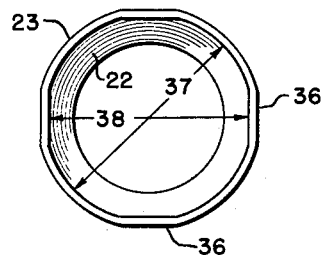
FIGURE 3 is an end view showing flats on the circumference of the washer.

A cross-sectional view of washer 21 is shown in FIGURE 2. These washers in one embodiment were formed from soft copper sheets of from .002″ to .003″ thickness fabricated to a conical shape 22 with a cold rolled skirt 23. This skirt, as shown in the end view of FIGURE 3 then is made non-circular by the four equally spaced flats 36. The washer skirt inside surface has a normal diameter 37 of sufficient size to fit over and clear the end 19 of fitting 16. The distance 38 between the under surfaces of the flats 36 oppositely placed on the skirt is slightly less than the diameter of the end 19 of fitting 16 so as to frictionally fit thereover upon insertion to thus retain the washer 21 in position during the coupling of the fitting 16 to the tube 11.

In connecting the coupling the fitting 16 with the washer 21 inserted over its end 19 will be mated to the flared end 12 of tube 11. Nut 28 is rotated to engage the threads until the shouldered engagement between the nut 28 and sleeve 24 forces the sleeve 24 and fitting 16 together, clamping the flared end 12 of the tube 11 between the conical seat 20 of the fitting 16 (with washer 21 thereover) and the conical surface 26 on the sleeve 24. The surface 26 of sleeve 24 will directly engage the external conical face 14 on the flared end 12 of tube 11 with enough friction that the sleeve 24 does not rotate with the rotation of the nut 28. The internal conical face 13 of the flared end portion 12 of the tube 11 compresses the crushable seal washer 21 against the end 19 of fitting 16 to fill all voids due to machining tolerances and the inevitable scoring in the micro-finished surfaces, that is undetectable except upon metallographic examination.

An outstanding advantage resulting from the present invention is that a flared tube fitting can be made to withstand leakage of small molecule fluids such as helium under high pressure without application of a wrench torque above the maximum approved allowable limit.

While certain preferred embodiments of the invention have been specifically disclosed, it is understood that the invention is not limited thereto as many variations will be readily apparent to those skilled in the art and the invention is to be given its broadest possible interpretation within the terms of the following claims.

What I claim is:

1. A flared tube coupling for a tube with a flared end portion comprising a sleeve adapted to fit over the tube and to abut the outer surface of said flared end portion, said sleeve having an internal annular flared conical surface at the abutting end thereof, a fitting with a bore therein adapted to mate with the bore of said tube, said fitting having an end portion with a tapered seat for engagement with the flared internal face on the tube and an outer cylindrical surface joining said tapered seat, a conical metallic washer seal with a cylindrical skirt adapted to fit over a portion of said cylindrical surface and a conical portion capable of engaging said tapered seat of said fitting, said skirt having internal flats thereon adapted to frictionally engage said fitting to retain said skirt in position thereon, means for drawing said sleeve and said fitting together and clamping the flared end of the tube and said seal between them, said seal being of a ductile material whereby said seal will fill any voids between the inner face of said flared tube and said seat.

2. A flared tube coupling for a tube with a flared end portion comprising a sleeve adapted to fit over the tube and to abut the outer surface of said flared end portion, said sleeve having an internal annular flared conical surface at the abutting end thereof, a fitting with a bore therein adapted to mate with the bore of said tube, said fitting having an end portion with a tapered seat for engagement with the flared internal face on the tube and an outer cylindrical surface joining said tapered seat, and a conical metallic washer seal with a cylindrical skirt adapted to fit over a portion of said outer cylindrical surface and a conical portion capable of engaging said tapered seat, said skirt having internal flats thereon adapted to frictionally engage said outer cylindrical surface of said fitting to retain said skirt in position thereon, means for drawing said sleeve and said fitting together and clamping the flared end of the tube and said seal between them, said means comprising a nut with an inner end adapted to abut said sleeve and overlie said sleeve, said flared tube end and said fitting end, said fitting and said tube having cooperating threaded connections whereby rotation of said nut draws said sleeve toward said fitting, said seal being of a crushable material whereby said seal will fill any voids between the inner face of said flared tube and said seat.

3. A flared tube coupling for a tube with a flared end portion which end portion has a given length comprising a fitting with a bore therein adapted to mate with the bore of said tube, said fitting having a tapered seat for engagement with the flared internal face on the tube and an outer cylindrical surface adjacent to said seat, a metallic conical washer seal having a conical portion adapted to fit over said tapered seat, said seal having an integral cylindrical skirt joined to said conical portion and fitting over at least a portion of said cylindrical surface, means pressing against substantially the full length of said flared end portion for drawing said flared end and said fitting together and clamping said seal therebetween, said metallic seal being of a ductile material and having flats on the internal surface of said cylindrical skirt adapted to frictionally engage said cylindrical surface.

4. A flared tube coupling for a tube with a flared end portion which end portion has a given length comprising a fitting with a bore therein adapted to mate with the bore of the said tube, a fitting having a tapered seat for engagement with the flared internal face on the tube and an outer cylindrical surface joining said seat, said outer cylindrical surface having a given diameter, a conical metallic washer seal adapted to fit over said tapered seat with an integral cylindrical skirt fitting over at least a portion of said cylindrical surface, means pressing against substantially the full length of said flared end portion for drawing said flared end and said fitting together and clamping said seal therebetween, said metallic seal being of a ductile material and having flats on the internal surface of said cylindrical skirt, and the distance between opposite internal surfaces of said flats being less than said given diameter of said outer cylindrical surface of said fitting.

5. A flared tube coupling for a tube with a flared end portion comprising a sleeve adapted to fit over the tube and to abut the outer surface of said flared end portion, said sleeve having an internal annular flared conical surface at the abutting end thereof and a shoulder spaced therefrom, a fitting with a bore therein adapted to mate with the bore of said tube, said fitting having a tapered seat for engagement with the flared internal face on the tube and an outer cylindrical surface adjacent said seat, a conical metallic washer seal with a cylindrical skirt adapted to fit over said tapered seat with said cylindrical skirt fitting over at least a portion of said outer cylindrical surface, said cylindrical skirt having internal flats thereon adapted to frictionally engage said outer cylindrical surface of said fitting to retain said seal in position on said fitting, means for drawing said sleeve and said fitting together and clamping the flared end of the tube and said seal between them, said means comprising a nut with a shoulder on its inner end adapted to abut said shoulder on said sleeve, said fitting and said tube having cooperating threaded connections whereby rotation of said nut draws said sleeve toward said fitting, said seal being of a ductile metallic material whereby said seal will fill any voids between the inner face of said flared tube and said seat.

References Cited in the file of this patent

UNITED STATES PATENTS

| | | |
|---|---|---|
| 954,549 | Turner | Apr. 2, 1910 |
| 1,426,724 | Fyffe | Aug. 22, 1922 |
| 1,992,312 | Kuehn | Feb. 26, 1935 |
| 2,357,669 | Lake | Sept. 5, 1944 |
| 2,424,727 | Wenk | July 29, 1947 |

FOREIGN PATENTS

| | | |
|---|---|---|
| 24,405 | Great Britain | Oct. 23, 1909 |